United States Patent Office 3,264,295
Patented August 2, 1966

3,264,295
4-AMINO-7-HEXYLAMINO-N-HEXYL-2-PHENYL-6-PTERIDINETHIOCARBOXAMIDE
Thomas S. Osdene, Berwyn, Pa., assignor to American Home Products Corporation, New York, N.Y., a corporation of Delaware
No Drawing. Filed Mar. 5, 1965, Ser. No. 437,598
1 Claim. (Cl. 260—251.5)

This application is a continuation-in-part of my co-pending application Serial No. 337,177, filed January 13, 1964.

This invention is directed to 4-amino-7-lower-alkyl-amino-N-alkyl-2-aryl-6-pteridinecarboxamides and to 4-amino-7-loweralkylamino-N-alkyl-2-aryl-6-pteridinethiocarboxamides.

The compounds of the invention have antiinflammatory activity and diuretic activity. They are represented by the following general formula:

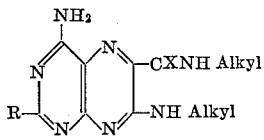

In the above formula, X is oxygen or sulfur. Symbol R preferably is phenyl; but equivalent compounds may have in the 2-position instead of a phenyl group, hydrogen, or 2-, 3-thienyl, or alkyl groups. Similarly, equivalent compounds may have substituents on the 2-phenyl group such as, for example, but without limitation, halo (lower)alkyl groups such as trifluoromethyl, halogen groups, alkoxy groups or alkyl groups. Preferred substituents for the phenyl group include chloro, methoxy and methyl. Obviously, any of the substituents on the phenyl group can be on the o-, m-, or p-positions on the ring.

As defined herein the term "alkyl" refers to straight chain and branched groups having from 1 to 6 carbon atoms therein.

The claimed compounds are prepared by condensing in a solvent such as a lower alkanol under anhydrous conditions a 4,6-diamino-5-nitroso pyrimidine with a N,N'-diloweralkyl malonamide or a N,N'dilower alkyldithiomalonamide where a 6-pteridinethio carboxamide is the desired end product.

This condensation preferably is carried out at the reflux temperature of the lower alkanol solvent and in the presence of a catalytic amount of a basic catalyst such as, for example, but without limitation, the alkali metals, their alkoxides and their alkoxyalkoxides, preferably sodium metal, sodium methoxide, potassium ethoxide and sodium alpha-ethoxyethoxide.

The 4,6-diamino-5-nitroso-pyrimidines and the N,N'-diloweralkylmalonamides and diloweralkyldithiomalonamides used as starting materials in the synthesis of the claimed compounds are generally known and readily prepared by procedures known to those skilled in the art of organic chemistry.

The following examples in which all temperatures are in degrees centigrade further illustrate the practice of the invention.

*Example 1*

Reflux a mixture of 100 g. of n-hexylamine and 80 g. of diethylmalonate for 5 hours. Cool to solidify the mass. Recrystallize from ethyl acetate to give N,N'-dihexylmalonamide melting at 129° C.

Add to a solution of 0.2 g. of sodium in 400 ml. of absolute ethanol 4.30 g. of 4,6-diamino-5-nitroso-2-phenylpyrimidine, followed by N,N'-dihexylmalonamide. Reflux the mixture and stir for 1 hour, during which time a precipitate deposits from solution. After cooling, remove the percipitate by filtration, and evaporate the filtrate to dryness on rotary evaporator to obtain a residue (M.P. 194° C., wt. 5.0 g.). Recrystallize from aqueous ethanol to yield 4-amino-N-hexyl-7-hexylamino-2-phenyl-6-pteridinecarboxamide, melting at 197° C.

*Example 2—preparation of 4-amino-7-ethylamino-N-ethyl-2-phenyl-6-pteridinecarboxamide*

To a solution of 0.92 g. of sodium in 500 ml. of absolute ethanol was added 8.6 g. of 4,6-diamino-5-nitroso-2-phenylpteridine, followed by 7.0 g. of N,N'-diethylmalonamide. The mixture was stirred and boiled under reflux for 45 mins. After allowing it to stand overnight, the precipitate which was formed was removed by filtration. The filtrate was evaporated to dryness and the residue was treated with 200 ml. of water and the insoluble brown material was collected on a filter. Several recrystallizations from ethanol afforded 4-amino-7-ethylamino-N-ethyl-2-phenyl-6-pteridinecarboxamide, M.P. 264°.

*Example 3—preparation of 4-amino-2-phenyl-N-propyl-7-propylamino-6-pteridinecarboxamide*

To a solution of 0.7 g. of sodium in 500 ml. of absolute ethanol was added 6.45 g. of 4,6-diamino-5-nitroso-2-phenylpyrimidine followed by N,N'-bis(propyl)malonamide. The mixture was stirred and boiled under reflux for 40 mins., during which time a yellow precipitate was slowly deposited. This was removed by filtration. On prolonged standing the mother liquors afforded yellow material. The two yellow precipitates were extracted with boiling water, affording a residue having a M.P. 292–293°. Recrystallization of these two combined materials from 2-ethoxyethanol afforded 4-amino-2-phenyl-N-propyl-7-propylamino-6-pteridinecarboxamide, M.P. 293°.

*Example 4—preparation of 4-amino-N-butyl-7-butylamino-2-phenyl-6-pteridinecarboxamide*

To a solution of 0.7 g. of sodium in 500 ml. of absolute ethanol was added 6.45 g. of 4,6-diamino-5-nitroso-2-phenylpyrimidine and 7.1 g. of N,N'-bis(n-butyl)malonamide. The mixture was stirred and boiled under reflux for 20 minutes during which time a precipitate was slowly formed. This was removed by filtration and on cooling the mother liquors another precipitate was deposited. The combined materials were extracted with boiling water and the residue was recrystallized from ethanol giving 4-amino-N-butyl-7-butylamino-2-phenyl-6-pteridinecarboxamide, M.P. 255°.

*Example 5—preparation of 4-amino-N-methyl-7-methylamino-2-phenyl-6-pteridinecarboxamide*

To a solution of 1.4 g. of sodium in 1 l. of absolute ethanol was added to 8.6 g. of N,N'-bis(methyl)malonamide followed by 12.9 g. of 4,6-diamino-5-nitroso-2-phenylpyrimidine. The resulting mixture was stirred and boiled under reflux for a total time of 3 mins. during which time a precipitate was deposited. This material was removed by filtration and the mother liquor was concentrated to dryness on a rotary evaporator. The resulting solid was treated with 150 ml. of water and the insoluble brown material was collected on a filter. Several recrystallizations from ethanol afforded 4-amino-N-methyl-7-methylamino-2-phenyl-6-pteridinecarboxamide, M.P. 265°.

*Example 6—preparation of 4-amino-7-hexylamino-N-hexyl-2-phenyl-6-pteridinethiocarboxamide*

To a solution of .23 g. of sodium in 200 ml. of absolute ethanol was added 2.15 g. of 4,6-diamino-5-nitroso-2-phenylpyrimidine, followed by 3.33 g. of N,N'-dihexyldithiomalonamide. The mixture was stirred mechanically and boiled under reflux for 10 min. The solution was cooled and a little yellow sticky precipitate was removed by filtration. On further cooling, the filtrate deposited yellow crystals, M.P. 225°. Recrystallization from ethanol afforded 4 - amino-7-hexylamino-N-hexyl-2-phenyl-6-pteridinethiocarboxamide, M.P. 228°.

The claimed compounds can be formulated for use in the same way as are known antiinflammatory and diuretic agents. This is to say, they can be formulated with the usual excipients, or with other active agents, into tablets or capsules for oral administration or dissolved under sterile conditions in a physiologically acceptable solvent for parenteral injection.

The invention therefor also includes the use of the claimed compounds in the treatment of inflamatory conditions and the use of the compounds in diuretic therapy especially in cases of edema due to congestive heart failure. For these purposes, the claimed compounds can be administered orally or I.M. at the rate of about 50 to 600 mg. per day in one to three doses. The exact dosage, to be determined by the prescribing physician, will vary according to the precise condition to be managed, its severity and other factors.

What is claimed is:

4-amino-7-hexylamino - N - hexyl-2-phenyl-6-pteridinethiocarboxamide.

References Cited by the Examiner
UNITED STATES PATENTS

| | | | |
|---|---|---|---|
| 2,975,180 | 3/1961 | Osdene et al. | 260—251.5 |
| 3,013,943 | 12/1961 | Berger | 167—65 |
| 3,020,202 | 2/1962 | Seay | 167—65 |
| 3,122,543 | 2/1964 | Osdene | 260—251.5 |
| 3,171,836 | 3/1965 | Osdene | 260—251.5 |

NICHOLAS S. RIZZO, *Primary Examiner.*

HENRY R. JILES, *Examiner.*